United States Patent
Zhang et al.

(10) Patent No.: US 10,212,025 B2
(45) Date of Patent: Feb. 19, 2019

(54) ROUTER MANAGEMENT METHOD, ROUTER AND MOBILE TERMINAL

(71) Applicant: Beijing Xiaomi Mobile Software Co., Ltd., Haidian District, Beijing (CN)

(72) Inventors: Pengfei Zhang, Beijing (CN); Yongfeng Xia, Beijing (CN); Tiejun Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/721,765

(22) Filed: Sep. 30, 2017

(65) Prior Publication Data

US 2018/0097688 A1    Apr. 5, 2018

(30) Foreign Application Priority Data

Sep. 30, 2016    (CN) .......................... 2016 1 0875952

(51) Int. Cl.
*H04L 12/24* (2006.01)
*H04L 12/28* (2006.01)
(Continued)

(52) U.S. Cl.
CPC ...... *H04L 41/0663* (2013.01); *H04L 12/2856* (2013.01); *H04L 41/026* (2013.01);
(Continued)

(58) Field of Classification Search
CPC ..... H04L 45/28; H04L 45/22; H04L 12/2856; H04L 41/0654; H04L 43/0811; H04L 45/60; H04L 12/14; H04L 12/1467; H04W 40/28; H04W 36/14; H04W 36/30; H04W 48/18; H04W 88/08; H04W 84/12; H04W 4/24; H04M 17/00; H04M 2215/32;
(Continued)

(56) References Cited

U.S. PATENT DOCUMENTS 8,971,209 B2 *  3/2015  Magnuson ............ H04W 24/02
                                                    370/216
2011/0134798 A1  6/2011  Magnuson
(Continued)

FOREIGN PATENT DOCUMENTS

CN    104506443 A    4/2015
CN    105577966 A    5/2016
(Continued)

OTHER PUBLICATIONS

Supplementary European Search Report in European App. No. 17193999.4, dated Jan. 22, 2018, 9 pages.
(Continued)

*Primary Examiner* — Nam T Huynh
(74) *Attorney, Agent, or Firm* — Arch & Lake LLP

(57) ABSTRACT

A router management method, a router, and a mobile terminal are provided. The method includes: when an abnormality is detected in the currently connected wideband network, switching communications from the wideband network to the mobile network, sending the failure message to a networked mobile terminal through the mobile network, and then using the mobile terminal to perform a repairing operation according to the failure message.

16 Claims, 14 Drawing Sheets

(51) Int. Cl.
*H04W 36/14* (2009.01)
*H04L 12/26* (2006.01)
*H04M 17/00* (2006.01)

(52) U.S. Cl.
CPC ...... *H04L 41/0668* (2013.01); *H04L 41/0672* (2013.01); *H04W 36/14* (2013.01); *H04L 43/028* (2013.01); *H04M 17/20* (2013.01)

(58) Field of Classification Search
CPC ........... H04M 15/8228; H04M 15/854; H04M 17/20; H04M 2017/26; H04M 2215/2033; H04M 2215/204; H04M 2215/22; H04M 2215/7833; H04M 2215/8166
See application file for complete search history.

(56) References Cited

U.S. PATENT DOCUMENTS

2013/0103827 A1     4/2013  Dunlap
2016/0226707 A1*    8/2016  Schallich ............ H04L 41/0806
2016/0308716 A1    10/2016  Chen

FOREIGN PATENT DOCUMENTS

CN          105828395 A    8/2016
WO         2016126491 A1   8/2016

OTHER PUBLICATIONS

Chinese Office Action issued in corresponding CN Patent Application No. 201610875952.7, dated Dec. 4, 2018, 7 pages.

\* cited by examiner

ROUTER MANAGEMENT METHOD, ROUTER AND MOBILE TERMINAL

CROSS-REFERENCE TO RELATED APPLICATION

This application is filed based upon and claims priority to Chinese Patent Application No. CN201610875952.7, filed on Sep. 30, 2016, the entire contents of which are incorporated herein by reference.

Technical Field

The present disclosure generally relates to the field of router technology, and more particularly, to a router management method, a router and a mobile terminal.

Background

At present, routers are widely applied in computer systems. A router is a device for connecting various computer networks including local area networks and wide area networks, which can be, for example, connected through the Internet. After a router is connected with a wideband network, it may automatically select and set routes according to conditions of channels to sequentially send signals through an optimal path. A router is a hub of the Internet, and can provide the function of a "traffic police" for communications. However, in some situations, a router may not be automatically connected to a wideband network as expected for various reasons. For example, when configuration information of the router is wrong, it may not connect with the wideband network, preventing the user from accessing the Internet through the router. It is, therefore, desirable to identify problems with and manage the connectivity of the router.

At present, when a router does not connect with a wideband network, a user typically needs to repair the configuration of the router by logging into an IP or network address on an intranet (such as 192.168.1.1) of the router through a local area network to repair the router and to further implement management over the router.

SUMMARY

According to a first aspect of embodiments of the present disclosure, a router management method is provided, which may include: identifying an abnormality in a wideband network; switching communications from the wideband network to a mobile network; sending a failure message to a networked mobile terminal instructing a user of the mobile terminal to remotely repair the wideband network. When the wideband network is recovered, switching communications from the mobile network to the wideband network.

In another aspect, the present disclosure provides a router, comprising: a processor; and a memory configured to store instructions executable by the processor. The processor is configured to: identify an abnormality in a wideband network; switch communications from the wideband network to a mobile network; send a failure message to a networked mobile terminal for instructing a user of the mobile terminal to remotely repair the wideband network through the mobile network; and when the wideband network is recovered, switching communications from the mobile network to the wideband network.

In yet another aspect, the present disclosure describes a mobile terminal, comprising: a processor; and a memory configured to store instructions executable by the processor. The processor is configured to: receive a failure message sent by a router through a mobile network when an abnormality is detected in a wideband network to which the router is connected, the failure message instructing a user of the router to remotely repair the wideband network; and repair the wideband network upon receiving the failure message.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
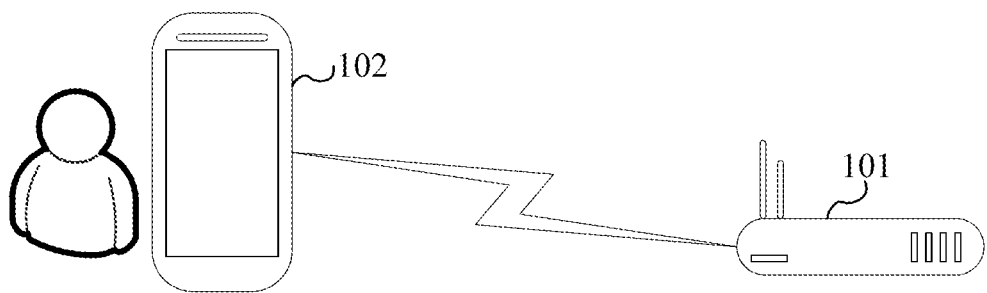
FIG. 1 is a schematic diagram illustrating an implementation environment involved in an exemplary router management method.

FIG. 1 is a schematic diagram illustrating an implementation environment involved in a router management method, according to an exemplary embodiment. As shown in FIG. 1, a router 101 and a mobile terminal 102 are included in the implementation environment. The router 101 includes circuitry for connecting to one or more computer network, as described above, and can also be equipped with communications equipment providing wireless communications, such as a 3rd-Generation (3G) or 4th-Generation (4G) mobile network card or the like, which can be used to connect the router 101 with a mobile network. Therefore, in the embodiment of the present disclosure, the router 101 may be connected with a wideband network, or may be connected with the mobile network, and the router 101 may be switched between the wideband network and the mobile network.

When the router 101 and the mobile terminal 102 are located in a local area network where the router 101 is located, they may communicate through the wideband network; and when an abnormality is identified in the router, such that, for example, the router cannot connect to the wideband network, the router 101 and the mobile terminal 102 may communicate through the mobile network. When the mobile terminal 102 is not located in the local area network where the router 101 is located, the router 101 may communicate with the mobile terminal 102 through the mobile network. That is, in the embodiment of the present disclosure, when an abnormality, such as a failure in a communications protocol or an inability to connect to the internet prevents the wideband network from connecting to the router 101, the router 101 may be connected with the mobile terminal 102 through the mobile network, and at this time, a user of the mobile terminal 102 may remotely repair the wideband network through the mobile terminal 102.

The mobile terminal 102 may be any of a number of small computing devices with processing and communication abilities, including a smart mobile phone, a tablet computer, an e-book reader, a Moving Picture Experts Group Audio Layer III (MP3) player, a Moving Picture Experts Group Audio Layer IV (MP4) player, a laptop computer and a wearable smart device, such as a smart bracelet.

Details about a specific router management method will be given in the following embodiments.

Figure 2:
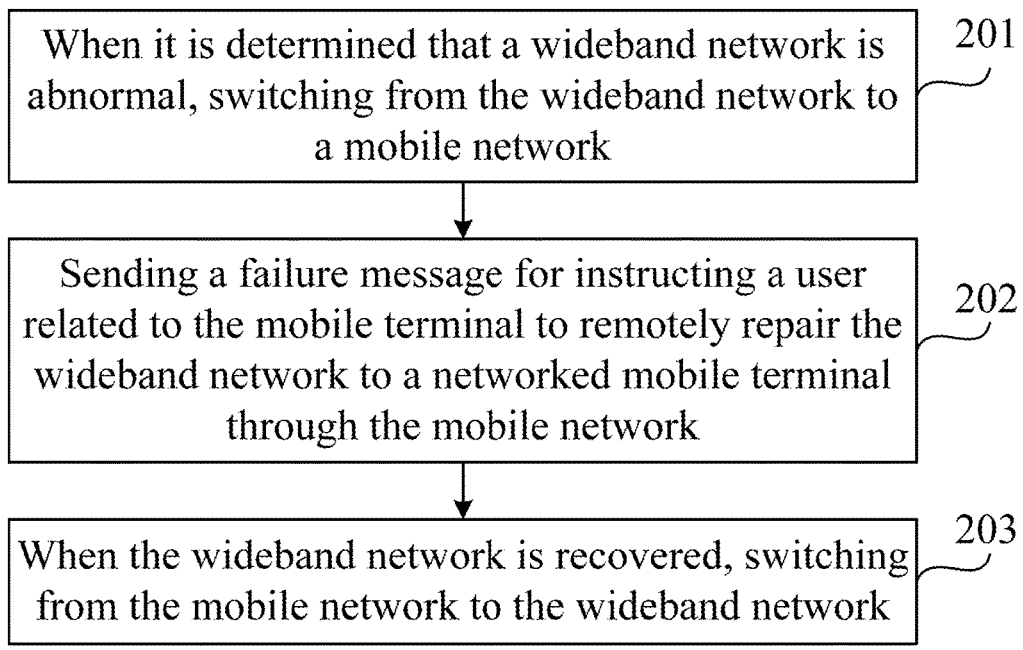
FIG. 2 is a flow chart showing an exemplary router management method.

FIG. 2 is a flow chart showing a router management method, according to an exemplary embodiment. The router management method is applied to a router. As shown in FIG. 2, the router management method includes the following steps.

In Step 201, when it is determined that a wideband network is abnormal, a switch from the wideband network to a mobile network is performed. For example, if the router cannot connect to a computer network, communications can be switched to the mobile network.

In Step 202, a failure message instructing a user of the mobile terminal to remotely repair the wideband network is sent to a networked mobile terminal through the mobile network. Here, the network mobile is paired with the router before the failure message is sent. For example, the failure message may instruct the user to pay an overdue balance to the Internet service provider for the network service.

In Step 203, when the wideband network is recovered, a switch from the mobile network to the wideband network is performed.

According to an exemplary method provided by present disclosure, when it is determined that there is an abnormality in the currently connected wideband network, a switch from the wideband network to the mobile network is performed, the failure message is sent to the networked mobile terminal through the mobile network, and then the networked mobile terminal performs a repairing operation according to the failure message. Therefore, there is no need to log into an intranet of the router from a local area network where the router is located to repair the router. Instead, the repair of the wideband network is achieved through the mobile terminal and the mobile network connected with the router, such that the wideband network can be repaired in a more flexible manner. The repair is more flexible, and also is not limited by time or location, thus making the router management more convenient.

Optionally, before switching the wideband network to the mobile network, the method may further include the following steps:

detecting whether the Internet can be accessed through the currently connected wideband network; and when it is detected that the Internet cannot be accessed through the currently connected wideband network, it is determined that the wideband network is abnormal.

Optionally, before switching the wideband network to the mobile network, the method may further include the following steps:

detecting whether a communication protocol used by the currently connected wideband network has been disconnected; and when it is detected that the communication protocol has been disconnected, identifying an abnormality in the wideband network.

Optionally, sending of the failure message to the bound mobile terminal through the mobile network may include the following steps:

the failure message is sent to a corresponding router management application ("APP") in the mobile terminal through an on-board router management APP, which may be built in;

or, the failure message is sent to the mobile terminal through a short messaging service (SMS) message or an instant message.

Optionally, after switching from the wideband network to the mobile network, the method may further include the following steps:

valid data and invalid data are filtered respectively from transmitted data, the invalid data being data that is not useful for repairing the wideband network and the valid data being communication data with a corresponding server; and the invalid data are shielded and the valid data are transmitted.

Figure 3:
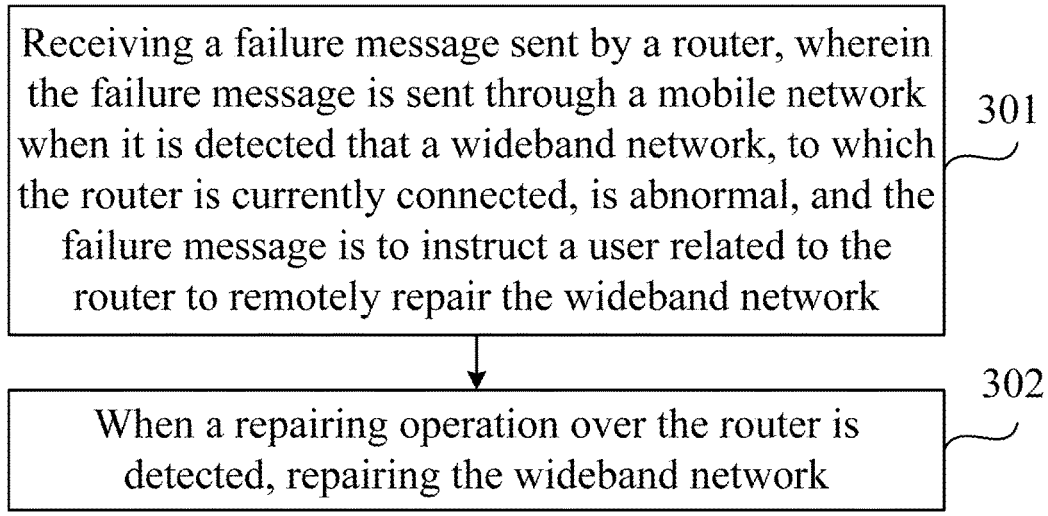
FIG. 3 is a flow chart showing an exemplary router management method.

FIG. 3 is a flow chart showing a router management method, according to another exemplary embodiment. The router management method is applied to a mobile terminal. As shown in FIG. 3, the router management method includes the following steps.

In Step 301, a failure message instructing a user of the router to remotely repair the wideband network is received from the router. The failure message is sent through a mobile network to which the router is currently connected when an abnormality is detected in the wideband network.

In Step 302, upon detection of a repairing operation from the router, the wideband network is repaired.

According to the method provided by the embodiment of the present disclosure, when the router detects an abnormality in the currently connected wideband network, a switch from the wideband network to the mobile network is performed, the failure message is sent to the networked mobile terminal through the mobile network, and then the mobile terminal performs the repairing operation according to the failure message. Therefore, there is no need to log into an intranet of the router from a local area network where the router is located to repair the router; instead, the wideband network is repaired through the mobile terminal and the mobile network connected with the router, such that the wideband network can be repaired in a more flexible manner, and in a manner that is not limited by time or location, thus making the management manner more convenient.

Optionally, the failure message may include network address information of a configuration page of the router, and repairing of the wideband network includes the following steps:

opening the configuration page pointed to by the network address of the configuration page of the router; and modifying the configuration information of the router in the configuration page.

Optionally, the failure message may include the network address of an payment management page of the router, and repairing of the wideband network may include the following steps:

opening the payment management page pointed to by the network address information of the payment management page of the router; and performing a service renewing operation in the payment management page over the wide area network. The service renewing operation may include paying an overdue balance and reactivating wideband network service with the service provider. The payment management page may display one or more payment options including a barcode, a two-dimensional barcode, etc.

Optionally, after repairing the wideband network, the method may further include the following step:

sending a notification message indicating that the wideband network is recovered to the router.

Figure 4:
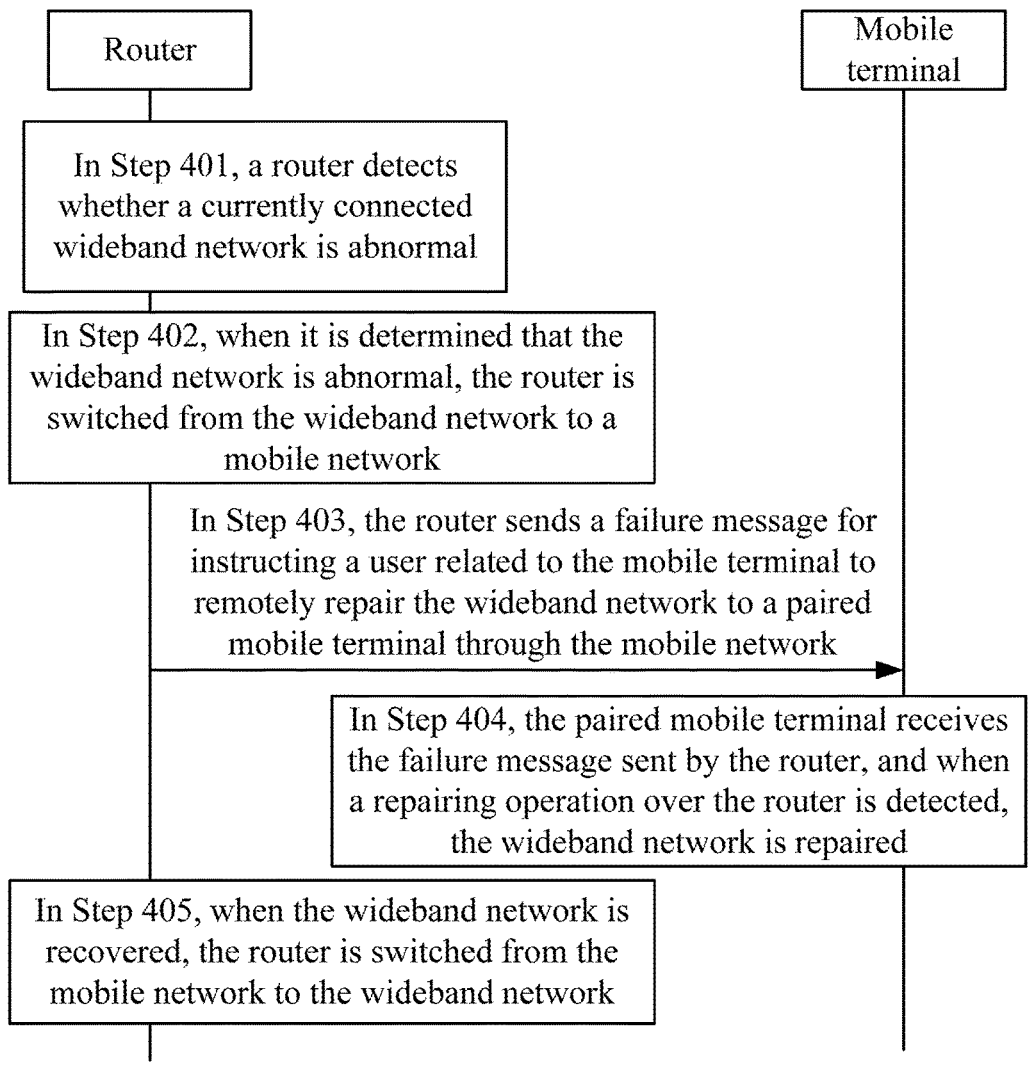
FIG. 4 is a flow chart showing another exemplary router management method.

FIG. 4 is a flow chart showing a router management method, according to an exemplary embodiment that includes interaction of a router and a mobile terminal. As shown in FIG. 4, the router management method includes the following steps.

In Step 401, a router detects whether an exception has occurred for a currently connected wideband network.

Here, the router detects when the wideband network currently connected to the router cannot access the Internet, which indicates an abnormality in the wideband network. There can be a number of reasons for the exception. For example, the configuration information of the router can be incorrect, causing the exception. Alternatively, there may be an overdue balance for the monthly service fee of the wideband network service. The overdue balance can cause the network service to be disconnected so that the cable modem cannot access Internet, which results the exception of the wideband network.

The router may detect an abnormality in the currently connected wideband network is abnormal in at least the following two manners.

A first manner: the router detects whether the Internet can be normally accessed through the currently connected wideband network, and when it is detected that the Internet cannot be normally accessed through the currently connected wideband network, it is determined that there is an abnormality in the wideband network.

For example, when the router detects that any network address such as "baidu.com" currently cannot be normally accessed through the connected wideband network, that is, any network address cannot be opened through the wideband network, it may be determined that there is an abnormality in the currently connected wideband network.

A second manner: the router detects whether a communication protocol used by the currently connected wideband network has been disconnected, and when it is detected that the communication protocol has been disconnected, it is determined that there is an abnormality in the wideband network.

Here, the communication protocol may be a Point-to-Point Protocol over Ethernet (PPPOE), Transmission Control Protocol (TCP), User Datagram Protocol (UDP), Internet Control Message Protocol (ICMP), Hypertext Transfer Protocol (HTTP), Post Office Protocol (POP), File Transfer Protocol (FTP), Internet Message Access Protocol (IMAP) and the like. When the communication protocol is the PPPOE, for example, and the router finds that the PPPOE has been disconnected at this moment, it may be determined that the currently connected wideband network is abnormal.

In Step 402, when it is determined that there is an abnormality in the wideband network, the router is switched from the wideband network to a mobile network.

In one the embodiment of the present disclosure, the router may be equipped with a 3G or 4G mobile network card or other wireless communications networking hardware and software, or the like, and when an abnormality is detected in the wideband network, the router may be switched to the mobile network through the mobile network card to send information and the like through the mobile network.

When being switched from the wideband network to the mobile network, the router may send a starting instruction to the mobile network card, to instruct the mobile network card to start working, and when the mobile network card has started working, the router is switched to the mobile network.

In Step 403, the router sends a failure message for instructing a user related to the mobile terminal to remotely repair the wideband network to a networked mobile terminal through the mobile network.

Here, the mobile terminal networked with the router is a target terminal to which the router sends the failure message when an abnormality is detected in the wideband network to which the router is currently connected. When sending the failure message to the networked mobile terminal through the mobile network, the router may send the failure message to a corresponding router management APP in the mobile terminal through a built-in router management APP, or may send the failure message to the mobile terminal through a short messaging service (SMS) message or an instant message, etc., which will not be limited in the embodiment of the present disclosure.

Optionally, relatively more data may be transmitted when the router is connected with the wideband network, including data useful for repairing the wideband network, and may further include some data that is not used for repairing the wideband network. However, after the router is switched from the wideband network to the mobile network, if all data currently transmitted by the router is transmitted through the mobile network, data transmissions or traffic may be wasted. Therefore, in one embodiment of the present disclosure, after the router is switched from the wideband network to the mobile network, valid data and invalid data may be filtered respectively from the transmitted data, the invalid data is shielded and the valid data is transmitted, to meet the purpose of limiting data transmissions and thereby saving traffic, where the invalid data is data not useful for repairing the wideband network, and the valid data is communication data of the router with a corresponding server. Shielding refers to, in the mobile network connectivity, forbidding accessing the Internet from the intranet prompting existence of a network connection to an ordinary user and the like. In one embodiment of the present disclosure, the valid data is transmitted such that the server may ensure a long connection of the router, that is, the server may ensure communication usage of the router. Transmitting the valid data may ensure that the router can be normally repaired.

Here, when the router filters the valid data and invalid data in the transmitted data, each data packet transmitted by the router may be parsed to obtain an attribute of the data packet, and the attribute of the data packet is used to determine whether each data packet includes valid data or invalid data. For any data packet, the attribute of the data packet includes an identifier capable of identifying whether the data packet includes data communicated between the router and the corresponding server, and whether the data packet includes valid data.

In addition, for the purpose of limiting data transmissions and thereby saving traffic, when sending the failure message to the mobile terminal through the mobile network, the router may initially generate and then compress the failure message prior to sending.

In Step 404, the mobile terminal receives the failure message sent by the router, and upon detection of a repairing operation over the router, repairs the wideband network.

If what the router sends is a compressed failure message, the mobile terminal may initially decompress the received failure message.

Here, the failure message may include network address information of a configuration page of the router or network address information of an payment management page of the router, so that the mobile terminal may repair the wideband network on the basis of the network address information of the configuration page or the network address information of the payment management page.

In combination with the above contents, upon detection of the repairing operation over the router, the mobile terminal repairs the wideband network in at least the following two cases.

In the first case, incorrect configuration information for the router causes an exception in the connected wideband network. Under such a condition, the user may open the configuration page of the router by inputting the network address information of the configuration page in the mobile terminal, and, upon receiving the network address information of the configuration page of the router, the mobile terminal opens the configuration page on the basis of the network address information and modifies the configuration information of the router in the configuration page. The network address information is a network address of the configuration page of the router, which can be in a format such as "192.168.1.1". In such a manner, the user interacts with the mobile terminal, and the user repairs the wideband network by operating the mobile terminal. In addition, when the failure message includes the network address information of the configuration page of the router, the mobile terminal may directly open the configuration page pointed to by the network address information of the configuration page of the router without interacting with the user, thereby opening the configuration page without any operation of the user. Compared with the manner that the user operates and opens the configuration page, this manner is more convenient.

In the second case, when there is an overdue balance for the wideband network service, the overdue balance can cause an exception of the wideband network currently connected to the router. In this case, the user may open the payment management page of the router in the mobile terminal and execute a service renewing operation, and acquire a service renewing operation over the wideband network. However, when the failure message includes the network address information of the payment management page of the router, the mobile terminal may open the payment management page according to the network address information of the payment management page, thereby opening the payment management page without any operation of the user, which is more convenient. Here, when the router detects a successful payment operation in the payment management page, it may be determined that the service renewing operation over the wideband network in the payment management page is accompanied.

Optionally, in order to let the router know about a repairing completion message in real time, when repairing is completed, the mobile terminal may send a notification message indicating that the wideband network is recovered to the router.

In Step 405, when the wideband network is recovered, the router is switched from the mobile network to the wideband network.

The router may then access the Internet through the wideband network.

The operation of determining whether the wideband network is recovered by the router may be implemented when it is determined that the notification message is received, or may be implemented by the router continuously detecting whether the communication protocol is connected and the like.

According to the method provided by the embodiment of the present disclosure, when the router determines that there is an abnormality in the currently connected wideband network, a switch from the wideband network to the mobile network is performed, the failure message is sent to the networked mobile terminal through the mobile network, and then the mobile terminal performs the repairing operation according to the failure message. Therefore, there is no need to log into an intranet of the router, from a local area network where the router is located, for performing a repairing operation on the router, when an abnormality is identified in the wideband network; instead, the method for remotely repairing the wideband network is achieved through the mobile terminal and the mobile network connected with the router, such that the wideband network can be repaired in a more flexible manner. Therefore, such a manner is not only more flexible for the router management method, but also is not limited by time or location, thus making the management manner more convenient.

Figure 5A:
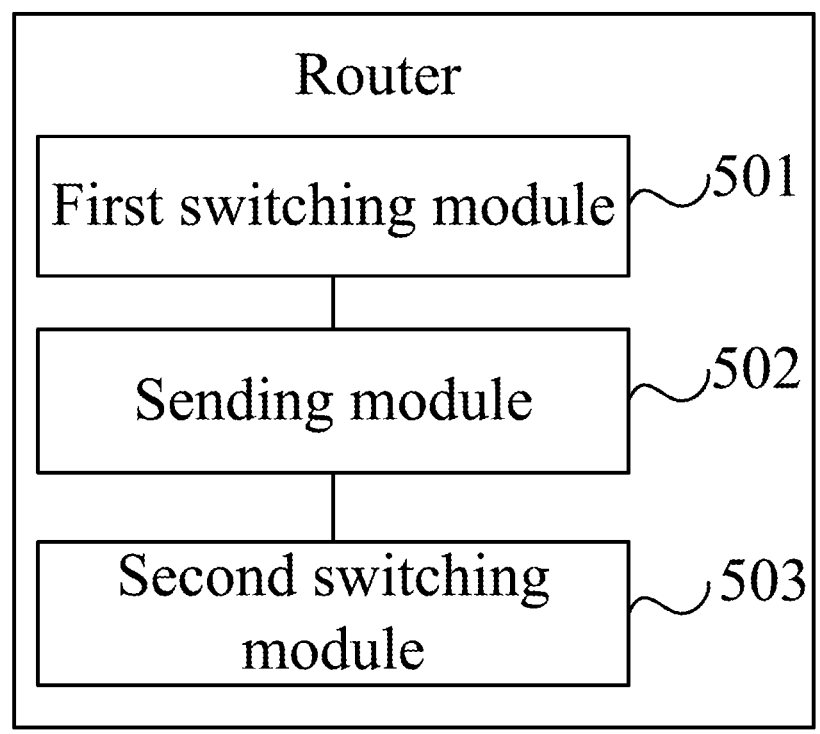
FIG. 5A is a block diagram of an exemplary router.

FIG. 5A is a block diagram of a router, according to an exemplary embodiment. The router may be configured to execute functions executed by the router in the embodiments corresponding to FIG. 2 or FIG. 4. Referring to FIG. 5A, the router includes a first switching module 501, a sending module 502 and a second switching module 503.

The first switching module 501 is configured to switch from the wideband network to a mobile network when an abnormality is identified in the wideband network.

The sending module 502 is configured to send a failure message for instructing a user of a networked mobile terminal to remotely repair the wideband network through the mobile network.

The second switching module 503 is configured to switch from the mobile network to the wideband network when the wideband network is recovered.

Figure 5B:
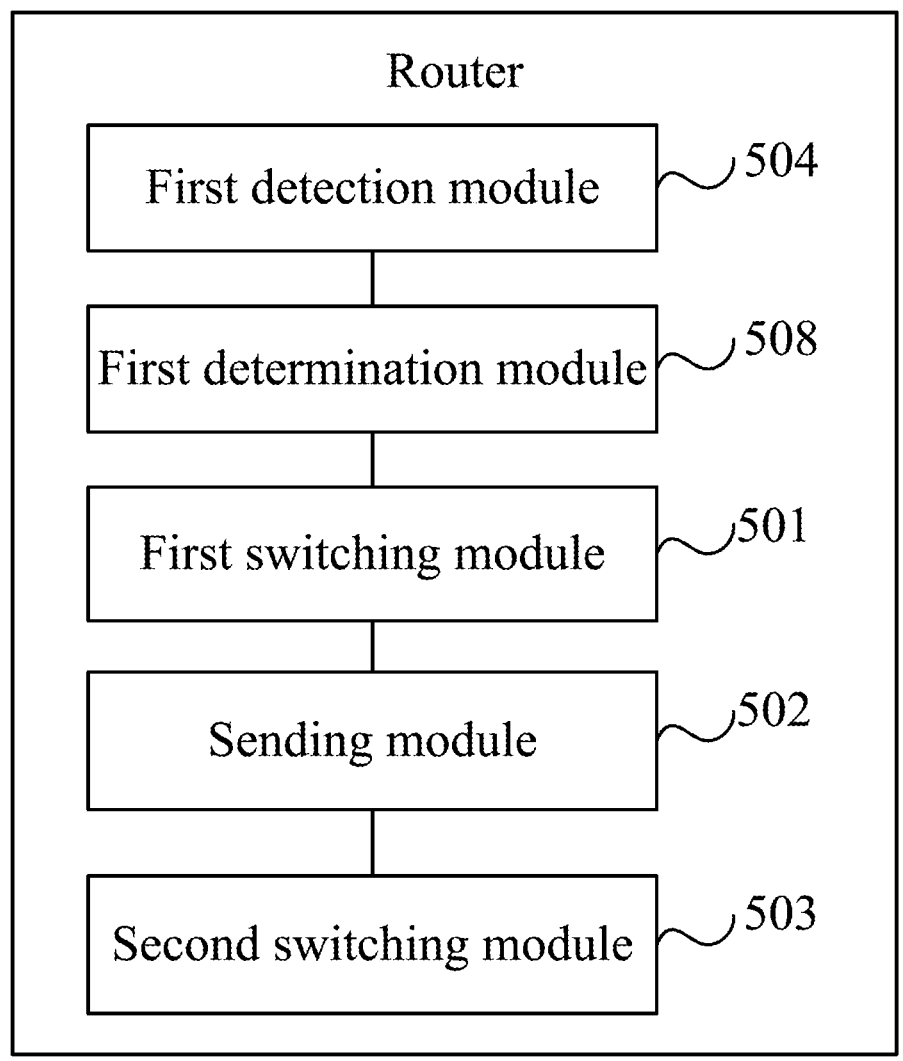
FIG. 5B is a block diagram of an exemplary router.

Optionally, as shown in FIG. 5B, the router may further include a first detection module 504 and a first determination module 508.

The first detection module 504 is configured to detect whether the Internet can be normally accessed through the currently connected wideband network.

The first determination module 508 is configured to, when it is detected that the Internet cannot be normally accessed through the currently connected wideband network, determine that there is an abnormality in the wideband network.

Figure 5C:
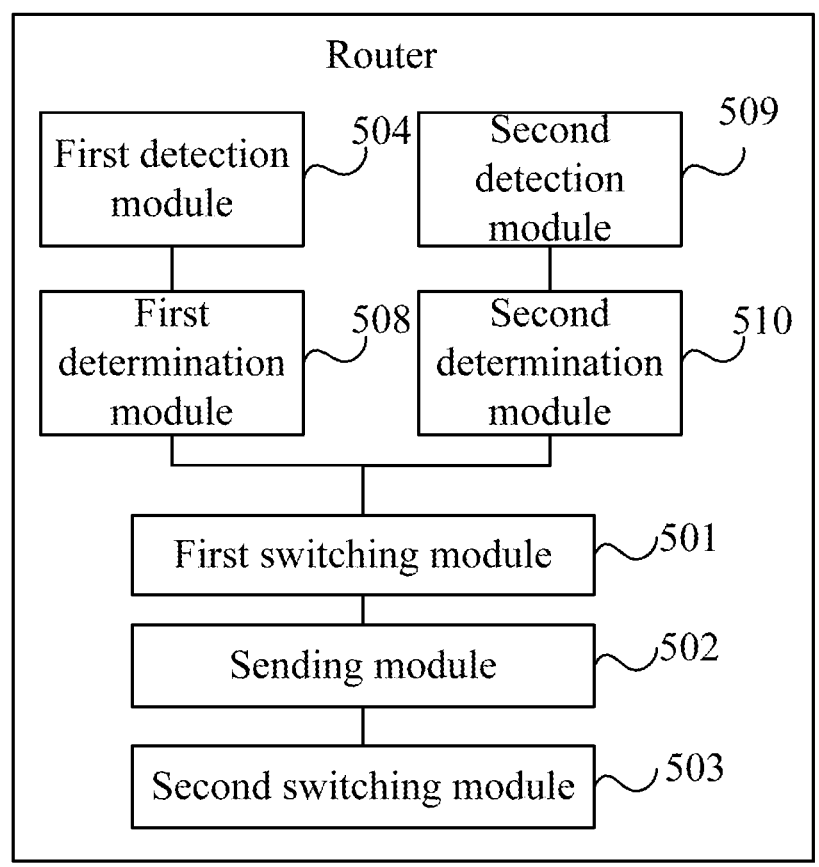
FIG. 5C is a block diagram of an exemplary router.

Optionally, as shown in FIG. 5C, the router may further include a second detection module 509 and a second determination module 510.

The second detection module 509 is configured to detect whether a communication protocol used by the currently connected wideband network has been disconnected.

The second determination module 510 is configured to, when it is detected that the communication protocol has been disconnected, determine that the wideband network is abnormal.

Optionally, the sending module 503 is configured to:

send the failure message to a corresponding router management APP in the mobile terminal through a built-in router management APP;

or, send the failure message to the mobile terminal through a short messaging service (SMS) message or an instant message.

Figure 5D:
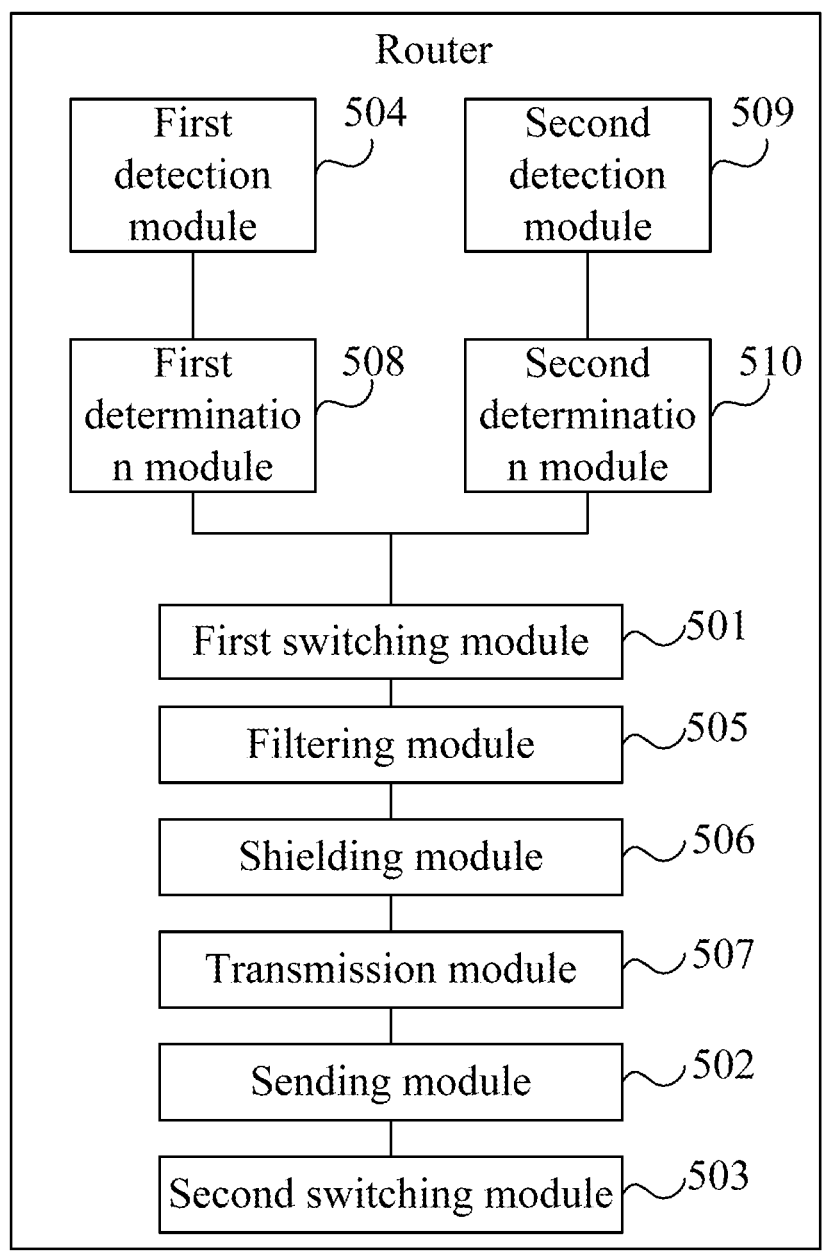
FIG. 5D is a block diagram of an exemplary router.

Optionally, as shown in FIG. 5D, the router may further include a filtering module 505, a shielding module 506 and a transmission module 507.

The filtering module 505 is configured to filter valid data and invalid data from transmitted data, the invalid data being data useless for repairing the wideband network and the valid data being communication data with a corresponding server.

The shielding module 506 is configured to shield the invalid data.

The transmission module 507 is configured to transmit the valid data.

With respect to the router in the above embodiment, the specific manners for performing operations for individual modules and sub-modules therein have been described in detail in the embodiments regarding the method, which will not be elaborated herein.

According to the router provided by the embodiment of the present disclosure, when the router determines that the currently connected wideband network is abnormal, a switch from the wideband network to the mobile network is performed, the failure message is sent to the bound mobile terminal through the mobile network, and then the mobile terminal performs the repairing operation according to the failure message. Therefore, there is no need to log in an intranet of the router, from a local area network where the router is located, for performing a repairing operation on the router, when the wideband network is abnormal, to which the router is connected; instead, the method for remotely repairing the wideband network is achieved through the mobile terminal and the mobile network connected with the router, such that the wideband network can be repaired in a more flexible manner. Therefore, such a manner is not only more flexible for the router management method, but also is not bounded by time or region, thus making the management manner more convenient.

Figure 6:
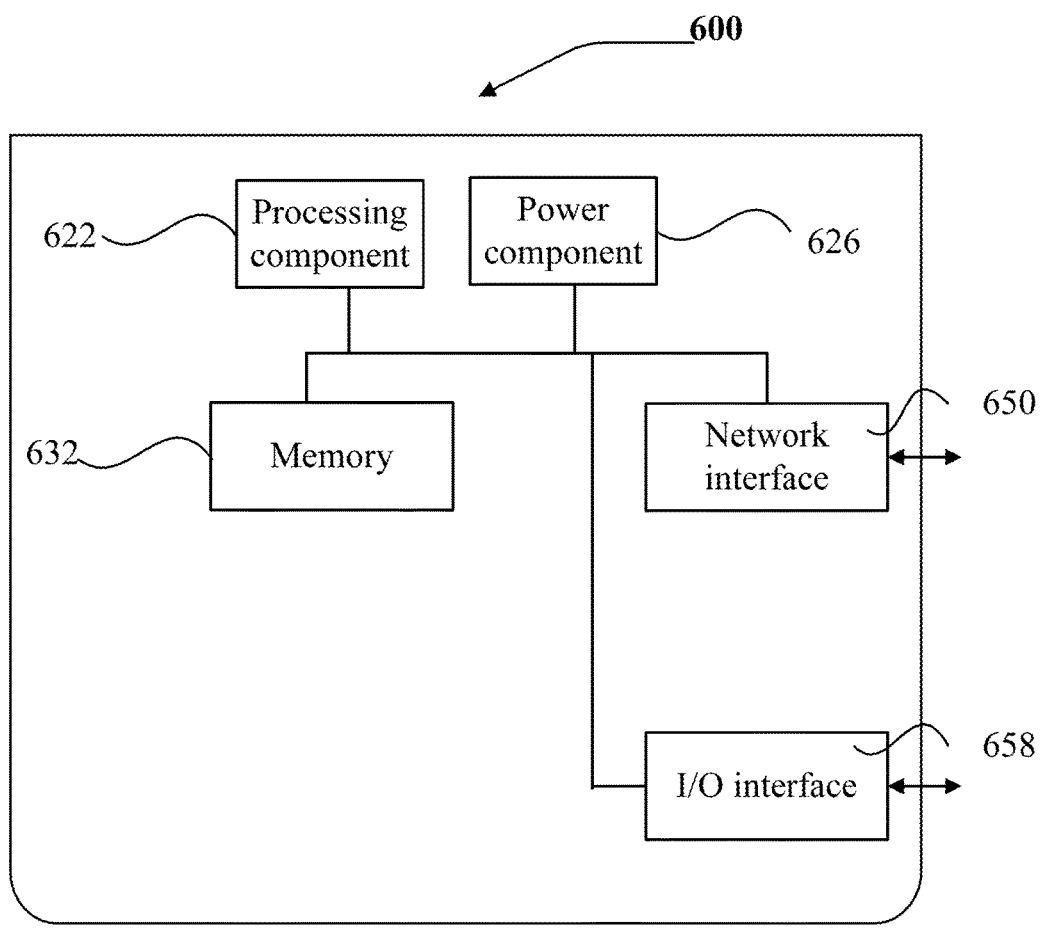
FIG. 6 is a block diagram of an exemplary router.

FIG. 6 is a block diagram of a router 600, according to an exemplary embodiment. For example, the router 600 may be a server or other computing device. Referring to FIG. 6, the router 600 includes a processing component 622 which includes one or more processors, and memory resources, represented by a memory 632, for storing instructions, such as an application, executable by the processing component 622. The application stored in the memory 632 may include one or more modules, each corresponding to a set of instructions. In addition, the processing component 622 is configured to execute the instructions, so as to execute the abovementioned router management method.

The router 600 may further include a power component 626 configured to execute power mangement of the router 600, a wired or wireless network interface 650 configured to connect the router 600 to a network, and an Input/Output (I/O) interface 658. The router 600 may be operated on the basis of an operating system stored in the memory 632, such as Windows Server™, Mac OS X™, Unix™, Linux™ or FreeBSD™, or other opeating systems.

The instructions in the memory 632, when being executed by the processor of the router, enable the router to execute a router management method, the method including the following steps:

when an abnormality is determined in the wideband network, switching is from the wideband network to a mobile network;

sending a failure message for instructing a user related to the mobile terminal to remotely repair the wideband network to a networked mobile terminal through the mobile network; and when the wideband network is recovered, switching from the mobile network to the wideband network.

Optionally, before switching from the wideband network to the mobile network, the method may further include the following steps:

detecting whether the Internet can be normally accessed through the currently connected wideband network; and when the Internet cannot be normally accessed through the currently connected wideband network, determining that there is an abnormality in the wideband network.

Optionally, before switching from the wideband network to the mobile network, the method may further include the following steps:

detecting whether a communication protocol used by the currently connected wideband network has been disconnected; and when it is detected that the communication protocol has been disconnected, identifying an abnormality in the wideband network.

Optionally, sending of the failure message to the networked mobile terminal through the mobile network may include the following steps:

the failure message is sent to a corresponding router management APP in the mobile terminal through a built-in router management APP;

or, the failure message is sent to the mobile terminal through a SMS message or an instant message.

Optionally, after switching from the wideband network to the mobile network, the method may further include the following steps:

valid data and invalid data are filtered respectively from transmitted data, the invalid data being data not useful for repairing the wideband network and the valid data being communication data with a corresponding server; and the invalid data is shielded and the valid data is transmitted.

According to the router provided by one embodiment of the present disclosure, when it is determined that there is an abnormality in the currently connected wideband network, communications are switched from the wideband network to the mobile network, a failure message is sent to the bound mobile terminal through the mobile network, and then the mobile terminal performs the repairing operation according to the failure message. Therefore, there is no need to log into an intranet of the router from a local area network where the router is located to perform a repairing operation on the router when an abnormality is identified in the wideband network; instead, the method for remotely repairing the wideband network is achieved through the mobile terminal and the mobile network connected with the router, such that the wideband network can be repaired in a more flexible manner. Therefore, such a manner is not only more flexible for the router management method, but also is not limited by time or location, thus making the management manner more convenient.

Figure 7A:
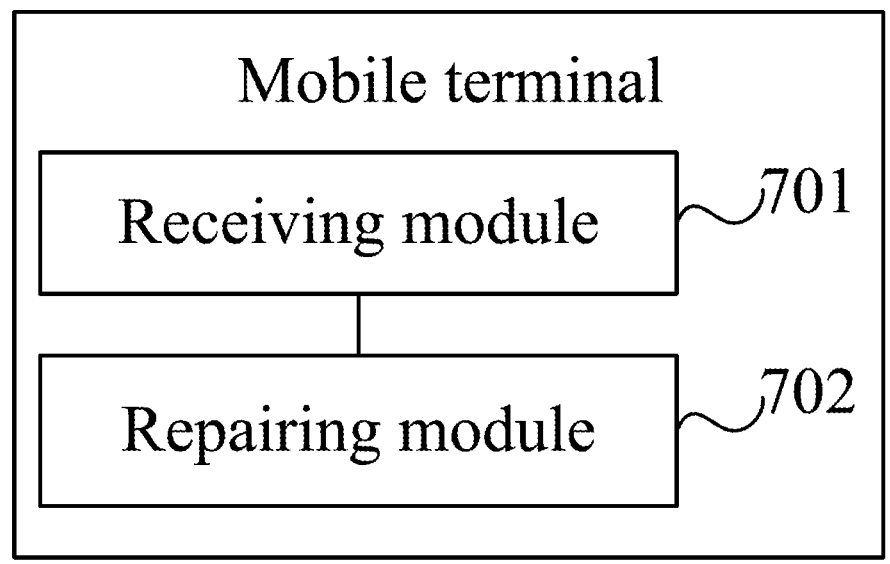
FIG. 7A is a block diagram of an exemplary mobile terminal.

FIG. 7A is a block diagram of a mobile terminal, according to an exemplary embodiment. The mobile terminal may be configured to execute functions executed by the mobile terminal in the embodiment corresponding to FIG. 3 or FIG. 4. Referring to FIG. 7A, the mobile terminal includes a receiving module 701 and a repairing module 702.

The receiving module 701 is configured to receive a failure message for instructing a user related to the router to remotely repair the wideband network, sent by a router, wherein the failure message is sent through a mobile network when an exception of a wideband network, to which the router is currently connected, is detected.

The repairing module 702 is configured to repair the wideband network upon detection of a repairing operation over the router.

Figure 7B:
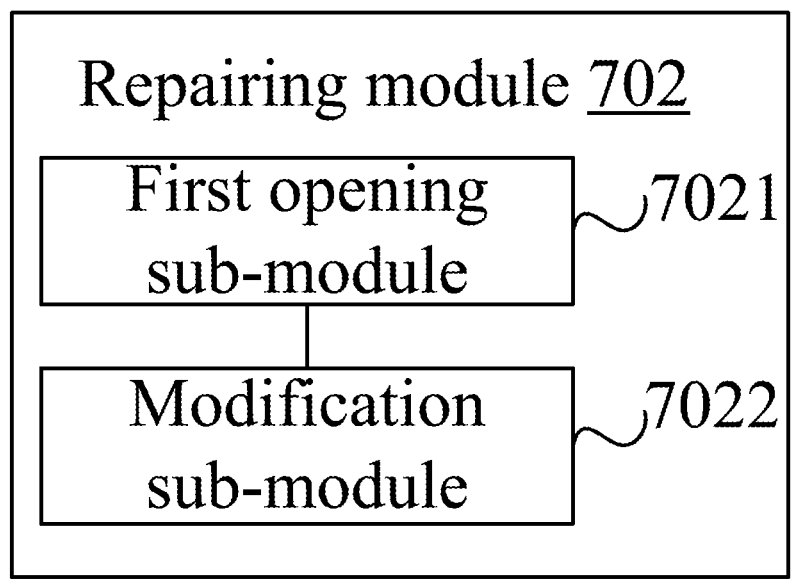
FIG. 7B is a block diagram of an exemplary repairing module.

Optionally, as shown in FIG. 7B, the failure message may include network address information of a configuration page of the router, and the repairing module 702 may include a first opening sub-module 7021 and a modification sub-module 7022.

The first opening sub-module 7021 is configured to open the configuration page, to which the network address information of the configuration page of the router points.

The modification sub-module 7022 is configured to modify configuration information of the router in the configuration page.

Figure 7C:
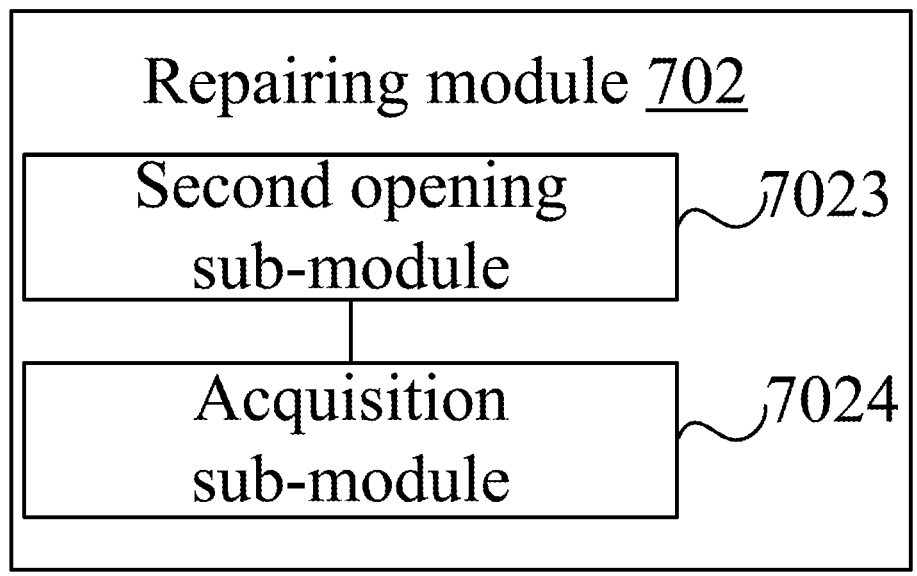
FIG. 7C is a block diagram of an exemplary repairing module.

Optionally, as shown in FIG. 7C, the failure message may include network address information of an payment management page of the router, and the repairing module 702 may include a second opening sub-module 7023 and an acquisition sub-module 7024.

The second opening sub-module 7023 is configured to open the payment management page, to which the network address information of the payment management page of the router points.

The acquisition sub-module 7024 is configured to acquire a renewing operation over the wideband network in the payment management page.

Figure 7D:
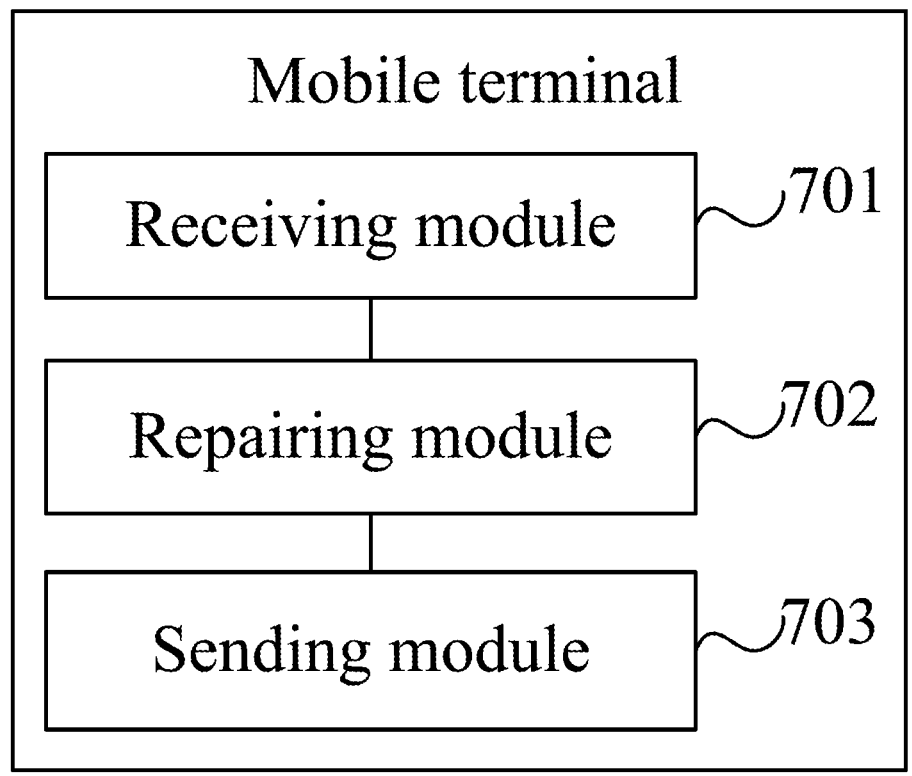
FIG. 7D is a block diagram of an exemplary mobile terminal.

Optionally, as shown in FIG. 7D, the mobile terminal may further include a sending module 703.

The sending module 703 is configured to, when repairing is completed, send a notification message for indicating that the wideband network is recovered to the router.

With respect to the mobile terminal in the above embodiment, the specific manners for performing operations for individual modules and sub-modules therein have been described in detail in the embodiments regarding the method, which will not be elaborated herein.

According to the mobile terminal provided by the embodiment of the present disclosure, when an abnormality is identified in the currently connected wideband network, a switch from the wideband network to the mobile network is performed, the failure message is sent to the networked mobile terminal through the mobile network, and then the mobile terminal performs the repairing operation according to the failure message. Therefore, there is no need to log in an intranet of the router, from a local area network where the router is located, for performing a repairing operation on the router, when an abnormality is identified in the wideband network; instead, the method for remotely repairing the wideband network is achieved through the mobile terminal and the mobile network connected with the router, such that the wideband network can be repaired in a more flexible manner. Therefore, such a manner is not only more flexible for the router management method, but also is not limited by time or location, thus making the management manner more convenient.

Figure 8:
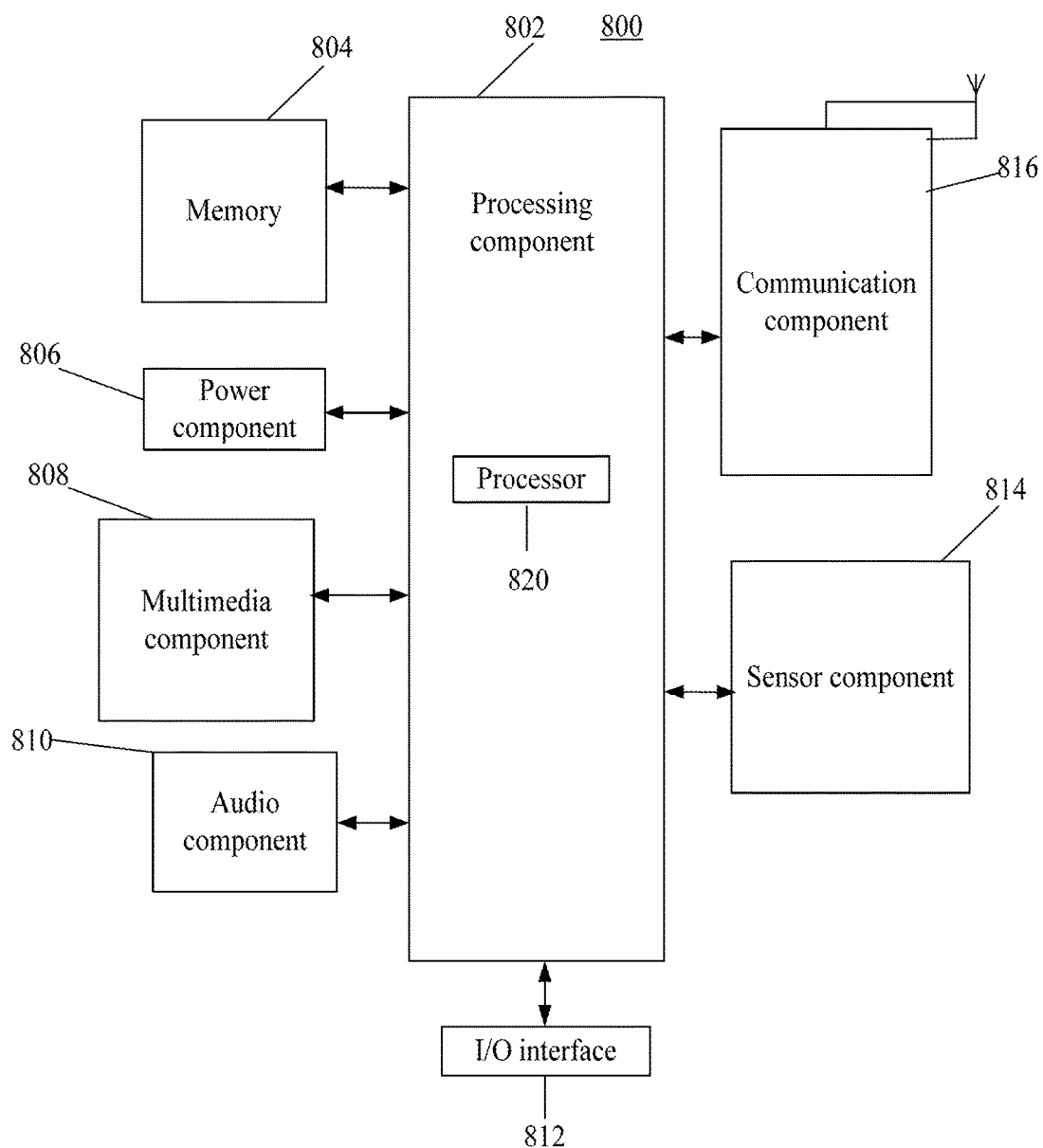
FIG. 8 is a block diagram of an exemplary mobile terminal.

FIG. 8 is a block diagram of a mobile terminal 800, according to an exemplary embodiment. The mobile terminal may be any of a number of computerized devices including processing and communication functions, as described below. For example, the mobile terminal 800 may be a mobile phone, a computer, a digital broadcast terminal, a messaging device, a gaming console, a tablet, a medical device, exercise equipment, a personal digital assistant and the like.

Referring to FIG. 8, the mobile terminal 800 may include one or more of the following components: a processing component 802, a memory 804, a power component 806, a multimedia component 808, an audio component 810, an I/O interface 812, a sensor component 814, and a communication component 816.

The processing component 802 typically controls overall operations of the mobile terminal 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the mobile terminal 800. Examples of such data include instructions for any APP programs or methods operated in the mobile terminal 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the mobile terminal 800. The power component 806 may include a power management system, one or more power supplies, and other components associated with the generation, management and distribution of power for the mobile terminal 800.

The multimedia component 808 includes a screen providing an output interface between the mobile terminal 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 808 includes a front camera and/or a rear camera. The front camera and/or the rear camera may receive external multimedia data when the mobile terminal 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the mobile terminal 800 is in the operation mode, such as a call mode, a recording mode and a voice recognition mode. The received audio signal may be further stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the mobile terminal 800. For instance, the sensor component 814 may detect an on/off status of the mobile terminal 800 and relative positioning of components, such as a display and small keyboard of the mobile terminal 800, and the sensor component 814 may further detect a change in a position of the mobile terminal 800 or a component of the mobile terminal 800, presence or absence of contact between the user and the mobile terminal 800, orientation or acceleration/deceleration of the mobile terminal 800 and a change in temperature of the mobile terminal 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging APP. In some embodiments, the sensor component 814 may also include an acceleration sensor, a gyroscope sensor, a magnetic sensor, a pressure sensor or a temperature sensor.

The communication component 816 is configured to facilitate wired or wireless communication between the mobile terminal 800 and another device. The mobile terminal 800 may access a communication-standard-based wireless network, such as a Wireless Fidelity (WiFi) network, a 2nd-Generation (2G) or 3G network or a combination thereof. In an exemplary embodiment, the communication component 816 receives a broadcast signal or broadcast associated information from an external broadcast management system through a broadcast channel. In an exemplary embodiment, the communication component 816 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a Bluetooth (BT) technology and another technology.

In an exemplary embodiment, the mobile terminal 800 may be implemented by one or more circuitry, which include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components. The mobile terminal 800 may use the circuitry in combination with the other hardware or software components for performing the above described methods. Each module, sub-module, unit, or sub-unit in the disclosure may be implemented at least partially using the one or more circuitry In an exemplary embodiment, there is also provided a non-transitory computer-readable storage medium including instructions, such as the memory 804 including instructions, and the instruction may be executed by the processor 820 of the mobile terminal 800 to implement the abovementioned method. For example, the non-transitory computer-readable storage medium may be a ROM, a Radom Access Memory (RAM), a Compact Disc Read-Only Memory (CD-ROM), a magnetic tape, a floppy disc, an optical data storage device and the like.

According to the non-transitory computer-readable storage medium, the instruction in the storage medium may be executed by the processor of the mobile terminal to enable the mobile terminal to execute a router management method, the method including:

receiving a failure message sent by a router, wherein the failure message is sent through a mobile network when it is detected that a wideband network to which the router is currently connected is abnormal, and the failure message is configured to indicate a user related to the router to remotely repair the wideband network; and upon detection of a repairing operation over the router, repairing the wideband network.

Optionally, the failure message includes network address information of a configuration page of the router, and repairing the wideband network when the repairing operation over the router is detected includes:

opening the configuration page to which the network address information of the configuration page of the router points; and modifying configuration information of the router in the configuration page.

Optionally, the failure message includes network address information of an payment management page of the router, and repairing the wideband network when the repairing operation over the router is detected includes:

opening the payment management page to which the network address information of the payment management page of the router points; and acquiring a renewing operation over the wideband network in the payment management page.

Optionally, after repairing the wideband network when the repairing operation over the router is detected, the method further includes:

when repairing is completed, sending a notification message to the router, the notification message being configured to indicate that the wideband network is recovered.

The technical solutions provided by the embodiments of the present disclosure may achieve at least the following beneficial effects. When it is determined that there are abnormalities that prevent connection to the wideband network, the communications are switched from wideband network to the mobile network, the failure message is sent to a mobile terminal in the network through the mobile network, and then the mobile terminal performs a repairing operation according to the failure message. Therefore, there is no need to log in an intranet of the router, from a local area network where the router is located, for performing a repairing operation on the router to correct an abnormality in the wideband network, to which the router is connected; instead, the method for remotely repairing the wideband network is achieved through the mobile terminal and the mobile network connected with the router, such that the wideband network can be repaired in a more flexible manner. Therefore, such a manner is not only more flexible for the router management method, but also is not limited by time or location, thus making the management of the router more convenient.

According to the mobile terminal provided by the embodiment of the present disclosure, when the router determines that the currently connected wideband network is abnormal, the wideband network is switched to the mobile network, the failure message is sent to the bound mobile terminal through the mobile network, and then the mobile terminal performs the repairing operation according to the failure message, so that a method for remotely repairing the wideband network through the mobile terminal and the mobile network connected with the router without logging in an intranet of the router to execute the repairing operation on the router in a local area network where the router is located when the wideband network connected with the router is abnormal is implemented, and a manner for repairing the wideband network is more flexible. Therefore, such a manner makes the router management method more flexible, time and regional limits to a management manner are also broken, and the management manner is more convenient.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A router management method, applied in a router, comprising:
    identifying an abnormality in a wideband network;
    switching communications from the wideband network to a mobile network;
    sending a failure message to a networked mobile terminal instructing a user of the mobile terminal to remotely repair the wideband network; and
    when the wideband network is recovered, switching communications from the mobile network to the wideband network;
    wherein the failure message comprises network address information of a payment management page of the router; and
    wherein sending the failure message to the networked mobile terminal instructing the user of the mobile terminal to remotely repair the wideband network comprises:
    sending the network address information of the payment management page of the router to the networked mobile terminal so as to instruct the user of the mobile terminal to acquire a renewing operation over the wideband network in the payment management page pointed to by the network address information of the payment management page.

2. The method of claim 1, wherein before switching from the wideband network to the mobile network, the method further comprises:
    detecting whether the Internet can be accessed through the currently connected wideband network; and
    identifying an abnormality in the wideband network when the Internet cannot be accessed through the currently connected wideband network.

3. The method of claim 1, wherein before switching from the wideband network to the mobile network, the method further comprises:
    detecting whether a communication protocol used by the currently connected wideband network has been disconnected; and identifying an abnormality in the wideband network when the communication protocol has been disconnected.

4. The method of claim 1, wherein sending the failure message to the networked mobile terminal through the mobile network comprises:
    sending, through an on-board router management application, the failure message to a corresponding router management application in the mobile terminal; or
    sending, through a short messaging service (SMS) message or an instant message, the failure message to the mobile terminal.

5. The method of claim 1, wherein after switching from the wideband network to the mobile network, the method further comprises:
    filtering valid data from invalid data in the transmitted data, the valid data being communication data with a corresponding server; and
    shielding the invalid data and transmitting the valid data.

6. A router management method, applied in a mobile terminal, comprising:
    receiving a failure message sent by a router, wherein the failure message is sent through a mobile network when an abnormality is identified in a wideband network to which the router is currently connected, and the failure message is used for instructing a user of the router to remotely repair the wideband network; and
    upon detecting a repairing operation from the router, repairing the wideband network;
    wherein the failure message comprises network address information of a payment management page of the router, and
    wherein upon detecting the repairing operation from the router, repairing the wideband network comprises:
    opening the payment management page pointed to by the network address information of the payment management page; and
    acquiring a renewing operation over the wideband network in the payment management page.

7. The method of claim 6, wherein the failure message comprises network address information of a configuration page of the router, and wherein upon detection of the repairing operation from the router, repairing the wideband network comprises:
    opening the configuration page pointed to by the network address information of the configuration page; and
    modifying configuration information of the router in the configuration page.

8. The method of claim 6, wherein after repairing the wideband network upon detection of a repairing operation over the router, the method further comprises:

when repairing is completed, sending a notification message to the router indicating that the wideband network is recovered.

9. A router, comprising:
a processor; and
a memory configured to store instructions executable by the processor,
wherein the processor is configured to:
identify an abnormality in a wideband network;
switch communications from the wideband network to a mobile network;
send a failure message to a networked mobile terminal for instructing a user of the mobile terminal to remotely repair the wideband network through the mobile network; and
when the wideband network is recovered, switching communications from the mobile network to the wideband network;
wherein the failure message comprises network address information of a payment management page of the router; and
wherein the processor is further configured to:
send the network address information of the payment management page of the router to the networked mobile terminal so as to instruct the user of the mobile terminal to acquire a renewing operation over the wideband network in the payment management page pointed to by the network address information of the payment management gage.

10. The router of claim 9, wherein the processor is further configured to:
detect whether the Internet can be accessed through the currently connected wideband network; and
when it is detected that the Internet cannot be accessed through the currently connected wideband network, identify an abnormality in the wideband network.

11. The router of claim 9, wherein the processor is further configured to:
detect whether a communication protocol used by the currently connected wideband network has been disconnected; and
when it is detected that the communication protocol has been disconnected, identify an abnormality in the wideband network.

12. The router of claim 9, wherein the processor is configured to:
send, through an on-board router management application, the failure message to a corresponding router management application in the mobile terminal; or, send the failure message to the mobile terminal through a short messaging service (SMS) message or an instant message.

13. The router of claim 9, wherein the processor is further configured to:
filter valid data from invalid data in transmitted data, the valid data being communication data with a corresponding server;
shield the invalid data; and
transmit the valid data.

14. A mobile terminal, comprising:
a processor; and
a memory configured to store instructions executable by the processor, wherein the processor is configured to:
receive a failure message sent by a router through a mobile network when an abnormality is detected in a wideband network to which the router is connected, the failure message instructing a user of the router to remotely repair the wideband network; and
repair the wideband network upon receiving the failure message;
wherein the failure message comprises network address information of a payment management page of the router, and in order to repair the wideband network, the processor is configured to:
open the payment management page pointed to by the network address information of the payment management page of the router; and
acquire a service renewing operation over the wideband network in the payment management page to pay an overdue balance and reactivate wideband network service.

15. The mobile terminal of claim 14, wherein the failure message comprises network address information of a configuration page of the router, and in order to repair the wideband network, the processor is configured to:
open the configuration page pointed to by the network address information of the configuration page; and
modify configuration information of the router in the configuration page.

16. The mobile terminal of claim 14, wherein the processor is further configured to:
send a notification message indicating that the wideband network is recovered to the router when repairing is completed.

* * * * *